United States Patent [19]

Wright

[11] 3,718,290

[45] Feb. 27, 1973

[54] RECORDING TAPE SEGMENT INDICATOR

[76] Inventor: Ronald G. Wright, 4 Sylvan Way, West Caldwell, N.J. 07006

[22] Filed: Jan. 27, 1971

[21] Appl. No.: 110,025

[52] U.S. Cl. ................................ 242/199, 274/11 C

[51] Int. Cl. ..... G03b 1/04, G11b 15/32, G11b 23/04

[58] Field of Search ............................ 242/197–200; 352/72–78; 274/4 C, 11 C

[56] References Cited

UNITED STATES PATENTS

| | | | |
|---|---|---|---|
| 2,937,818 | 5/1960 | Zorn | 242/199 |
| 3,565,367 | 2/1971 | Yamamoto | 242/199 |

*Primary Examiner*—Leonard D. Christian
*Attorney*—Edward Goldberg

[57] ABSTRACT

A transparent window of a recording tape container or cassette has longitudinally spaced markings disposed directly over the tape supply winding indicating the location of internal pre-recorded tape segments. Precision measurements are made of the beginning or end of each segment with respect to the center of the supply reel and the end of the window. The tape recording is played in a standard cassette record player and the radial edge of the tape at the selected point is magnified and measured. Marks indicating the window ends and segments are placed on a magnified scale pattern which is photoreduced to normal size and printed repetitively on transparent plastic sheets. The sheets are cut to the size of the window which is inserted into the cassette opening with the marks, such as dots, positioned directly over the internal segment points on a repetitive basis for mass produced tape recordings.

11 Claims, 2 Drawing Figures

INVENTOR.
RONALD G. WRIGHT
BY Edward Goldberg
ATTORNEY

RECORDING TAPE SEGMENT INDICATOR

BACKGROUND OF THE INVENTION

1. Field of the Invention

This invention relates to recording tape segment indicator devices and particularly to a novel tape container transparent window which provides markings at locations corresponding to selected internal prerecorded tape segments on a repetitive mass production basis.

2. Brief Description of the Prior Art

In the past, in order to locate a particular selection on a magnetic tape recording, it was necessary to scan large portions of the tape utilizing the play, fast forward and rewind modes of the record player and by trial and error find the beginning or end of the desired segment. One aid in this process has been the provision of an opening and transparent window in a pre-recorded tape magazine or cassette which includes a scale molded into the casing along the lower edge of the opening. The scale is graduated in 10 division lines between 0 and 100 to indicate approximate positions. By manually marking points along the scale or noting the reading at desired locations, an individual could identify the particular segment for future reference. Other known tape measuring and indicating devices are found in U.S. Pat. No. 2,937,818 which provides graduated divisions in the form of circular markings on an observation window, and in U.S. Pat. Nos. 2,802,290 and 2,946,127 which provide indicator strips secured to a reel and having openings in the strips which can be individually marked along the edges for indexing purposes. All of these devices however, have lacked sufficient precision and reproducibility required for marking prerecorded tapes in standard enclosed containers for accurate indication of internal segments of mass produced tape recordings.

SUMMARY OF THE INVENTION

It is therefore the primary object of the present invention to provide a transparent window for a container of prerecorded tape which has markings directly over the tape winding at positions indicating the beginning or end of selected internal tape segments and is reproducible for large quantities of the same cassette type recordings.

This is achieved by accurately measuring the radial edge of the tape winding at the desired points with respect to the center of the reel and end of the window and marking the locations on a magnified scale pattern. This is then photoreduced to normal size and printed in quantity on transparent plastic sheets which are cut to the size of the window and inserted in respective container openings. The internal segment markings may be in the form of minute opaque colored dots on a central surface of the window and additional reference marks are disposed along the ends of the window. Each side of the container may have separate tape recordings and windows with segment indicating marks and identical marked windows are provided for a plurality of identical containers. The details of the invention will be more fully understood and other objects and advantages will become apparent in the following description in conjunction with the accompanying drawings.

DESCRIPTION OF THE PREFERRED EMBODIMENTS

Figure 1:
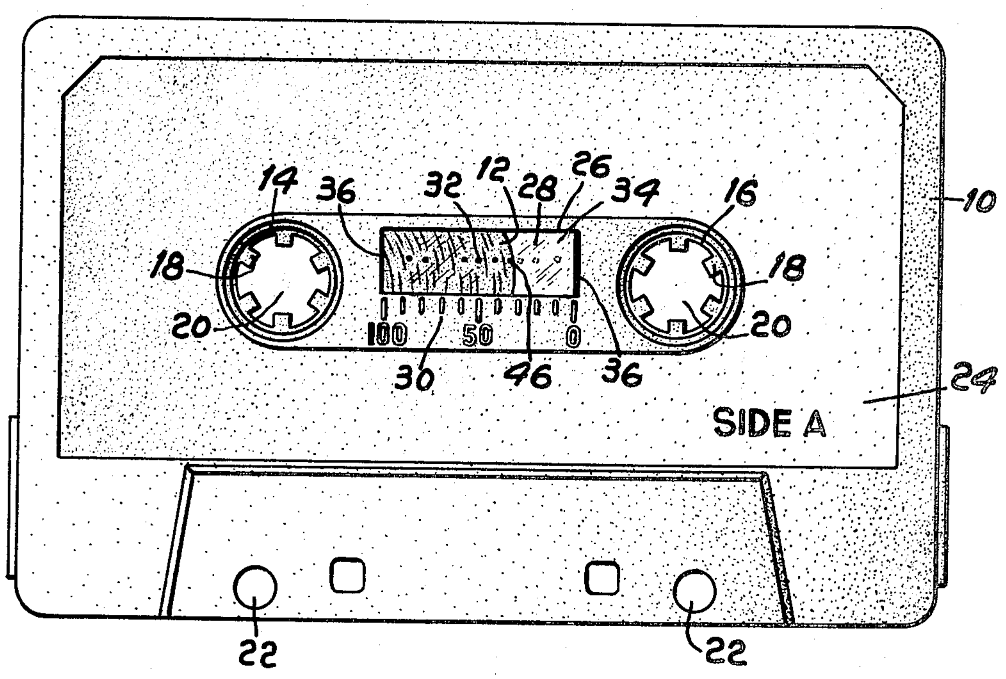
FIG. 1 is a view of one side of a typical magnetic recording tape container including the novel window having segment indicating marks thereon.

As shown in FIG. 1, a molded plastic container or cassette 10 has a prerecorded reel of magnetic tape 12 wound on a supply reel 14 adjacent one end of the container and a take-up reel 16 mounted adjacent the other end. Suitable drive means, such as teeth 18 on the internal surface of the rims of the reels, are positioned within openings 20 extending through the container and are adapted to be coupled with or engage mating drive shaft hubs extending from the standard record player. Other openings 22 near the base of the container engage other mating shafts extending from the record player and serve to align the container within a shallow rectangular receiving area of the player. The magnetic recording and playing heads of the player are also mounted along openings in the base of the container for engaging the tape as it travels between the reels. The container has two opposite side walls 24 which are substantially symmetrical so that the unit is reversible, with the top side becoming the bottom side when inverted. The tape winding 12 generally has two tracks, one adjacent each opposite side wall, and the supply reel 14 at one end of one side becomes the take-up reel 16 at the other end of the opposite side and vice versa when the container is reversed, to provide two separate recording tapes, one on each side, which can be played independently.

Each side of the container has a centrally disposed rectangular window opening 26 normally enclosed by a transparent plastic window 28 through which the tape winding 12 on supply reel 14 may be observed. The opening is generally offset and centered slightly above the line between the two reel centers. This provides space for a scale 30, having division marks in equal graduations between 0 and 100, along the lower edge of the opening. The purpose of the scale is to permit a visual indication and location of points within the recorded tape winding which are of particular interest to an individual using the player. For example, the beginning or end of a specific tape segment or recorded selection may be manually marked on the scale or the reading noted for future reference to locate this same point more easily at another time. This, of course, is a very rough approximation which can be applied only to an individual tape record.

In the present invention, indicating marks 32 such as dots are applied directly on a surface of the transparent window, with the marks being positioned over the supply reel winding at the selected points such as the beginning or end of a pre-recorded internal tape segment. The marks are placed with a high degree of precision to facilate location of the same segment point on a repetitive basis for mass produced tape recordings. A plurality of segments may each be marked in a similar manner with irregularly spaced dots along a central portion of the window positioned at different radial lengths of the tape winding from the center of the supply reel as shown, and the marks are likewise applied to a window 34 on the opposite side of the container for the second track of the tape.

In order to obtain very accurate measurements of the tape segment points to be marked, the pre-recorded tape, including a number of selections, is played on a standard good quality tape recorder-player. The edge of the moving tape is viewed at the desired location, such as the beginning or end of each selection or interval between successive segments, and precise measurements made of the distance between the center of the supply reel and the radial periphery of the tape winding edge taken along a line extending approximately between the centers of the two reels or displaced slightly above and parallel to that line. The latter displacement will center the marks along the width of the window which is offset from the centers of the reels. Additional measurements are made of the distances from the supply reel center to the ends of the window opening to establish the length of the window. A predetermined distance may be added to the side ends of the window to permit engaging co-responding internal lateral slots 36 in the edges of the window opening at each side. The measurements are preferably made to the nearest thousandth of an inch using an optical comparator of high magnification. In order to compensate for minor variations due to side-to-side movement of the reels or differences between several of the same tape recordings, a few measurements may be taken at each point and averaged.

Another measuring technique that can be used involves a mathematical calculation which relies on segment timings. Each internal segment is accurately timed in seconds and the time totaled at each point in reverse order so that the starting point is zero seconds at the inner end of the tape winding or outer surface of the rim of the supply reel. The cumulative time for each segment, progressively from the rim of the reel outwardly is utilized in the formula:

$$B=\sqrt{\frac{TVC}{\pi}+a^2}$$

wherein $B$ is the distance to the tape edge, $T$ is the reverse cumulative segment time, $V$ is the normal velocity of the tape (about 1 ⅞ inches per second), $C$ is the tape thickness, and $a$ is the radius of the reel rim. This formula can be converted into graph form, giving radial measurements for each internal segment, based on segment times.

In either method, a pattern of ten times the normal size is drawn on suitable paper with pin points indicating each segment point along the center of the window and reference brackets, corner marks or an outline drawn to indicate the window end boundaries. Black dots of a predetermined size are placed over the pinpoints as the segment marks. In most instances a customer name, program title or number is added for identification purposes. The completed ten to one scale pattern is then photoreduced to normal size, printing negatives and plates prepared and thin sheets of clear transparent vinyl plastic, in the order of 0.02 inches thick, are imprinted with a plurality of identical marking patterns for each side of the tape container. A sufficient number is made to accommodate a production run of a particular cassette recording.

Figure 2:
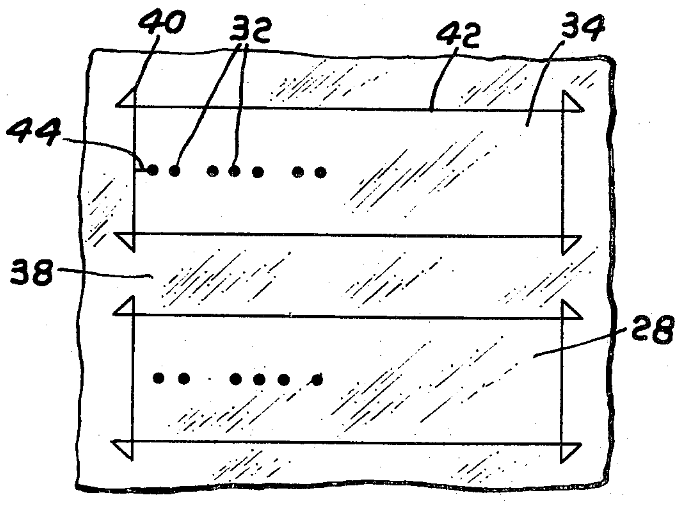
FIG. 2 is an enlarged view of a pair of transparent windows printed on a plastic sheet and showing the window end and segment indicating marks.

FIG. 2 illustrates a typical pair of marked window patterns 28,34 for opposite sides of the container as printed on a plastic sheet 38. The segment indicator dots 32 are preferably of a white or light colored printing material to contrast with the dark tape winding and may be about 0.02 inches or somewhat smaller in diameter. The dots may also be of various colors or shapes, such as circles, squares or triangles, to provide further distinction between record segments. Triangular marks 40 at the corners of the window, brackets at the side ends or an outline 42 may be used to mark the exact length and width of the window. The vertical lines of the triangle indicate the side end dimensions of the window pattern while the horizontal lines provide the top and bottom limits. An additional line 44 on one window may be used to indicate a blank section of tape at the end of a supply reel winding which is a normal occurrence when tape of a standard length cannot be completely filled by recorded segments.

A precision die made to the predetermined size, then cuts these window pieces to the desired dimensions within the area outlined by the triangles or on or along the boundary lines and the properly sized pieces are inserted into the corresponding window openings on each side of the containers. Where the window opening has slots in the side edges, an additional length is added to the window side ends to engage the slots. In some cases where the container has original plastic window inserts and it is desired that these be left in place rather than be removed, the marked windows are merely snapped into the openings in a close fit over the first window. In this instance the length of the marked windows are reduced since they do not engage the edge slots of the openings. The markings are also preferably printed on the reverse or under surface of the transparent window and inserted face down to provide protection against wear or scratching of the marks and reduce parallax reading errors. The windows may remain permanently attached within the cassette openings and if desired may be sealed in place by suitable adhesives or ultrasonic or high frequency welding to provide an integral unit.

When the user of the tape cassette to locate a particular recorded selection of several on one side of the tape, he merely places the unit in the record player with the proper side up and presses the fast forward, rewind or play buttons to move the tape winding in the required direction. He then visually aligns the peripheral moving tape edge with an edge of the appropriate printed dot, as shown at 46 in FIG. 1, and stops the player when the edges are reasonably well matched. The play button is then pressed and the beginning of the desired segment should be quite close, generally within 10 seconds of playing time. If, for example, the right hand edge of the dot is used as the visual reference to find the beginning of a segment, the center of the dot would fall in the interval between segments, which may also be about 10 seconds.

Other variations of this device can include the use of different colored, sized or shaped dots to indicate different sides or tracks. Thus, a four track tape recording may employ two tracks arranged on each side of a container and corresponding double rows of spaced marks of distinguishing colors or shapes for each row may be placed on windows on each side.

The present invention thus provides a novel improved tape recording segment indicator device which is capable of precise location of selected prerecorded internal tape winding portions for reproduced cassette type units. The marked windows form a permanently associated part of the container and obviate tne need for the user to individually mark segments. While only a single embodiment has been illustrated and described, it is apparent that many variations may be made in the particular design and configuration without departing from the scope of the invention as set forth in the appended claims.

What is claimed is:

1. A recording tape segment indicator device comprising,
  a tape container;
  a tape supply reel and winding mounted within said container adjacent one end, said tape winding including a plurality of separate pre-recorded segments;
  a take-up reel mounted within said container adjacent the other end;
  driving means connected to said reels and adapted for coupling through a wall of said container;
  a side wall of said container having a central opening extending longitudinally between said reels over said tape winding;
  a transparent window in said opening; means on said window for establishing a reference point with respect to a fixed position at said tape winding; and
  a plurality of irregularly spaced selectively positioned markings on said window directly over predetermined internal portions of said tape winding, each marking being disposed at a longitudinal position from said reference point corresponding to the location of a respective pre-recorded segment within said tape winding.

2. The device of claim 1 wherein said tape winding is of magnetic recording tape and said markings indicate selectively the beginning and end of successive internal tape segments.

3. The device of claim 2 wherein said tape segment indicating markings are spaced in a generally radial direction at predetermined distances from the center of said supply reel along a central area of said window.

4. The device of claim 3 wherein said markings are in the form of dots of opaque printing material on a surface of said window.

5. The device of claim 3 wherein said means for establishing a reference point includes additional markings adjacent the ends of said window defining the location of said window ends relative to the center of said supply reel and with respect to said segment markings.

6. The device of claim 3 wherein said window is detachably secured within said opening.

7. The device of claim 3 wherein said container includes a reversible tape cassette having substantially symmetrical opposite side walls, said tape winding having two recording tracks one on each side of said tape adjacent respective opposite side walls, each track having a plurality of recorded segments, said reels being reversible so that said take-up reel with respect to one side wall is a supply reel with respect to the opposite side wall, and said supply reel with respect to said one side wall is a take-up reel with respect to said opposite side wall, each said side wall having a central opening and transparent window with said segment markings thereon over respective said supply reel tape windings.

8. The device of claim 5 wherein said additional markings are at the corners of each said window end defining the length and width of said window with respect to said opening.

9. The device of claim 6 wherein said window opening is generally rectangular and includes laterally extending slots in the edges of the wall along each end of said opening, opposite side ends of said window engaging respective said slots.

10. The device of claim 7 wherein said segment markings are disposed on the under surface of each said window.

11. The device of claim 7 wherein said segment markings includes dots of different colors.

* * * * *